Jan. 26, 1954
P. C. ACKERMAN
2,667,085
HYDRODYNAMIC TRANSMISSION
Filed March 18, 1950
3 Sheets-Sheet 1
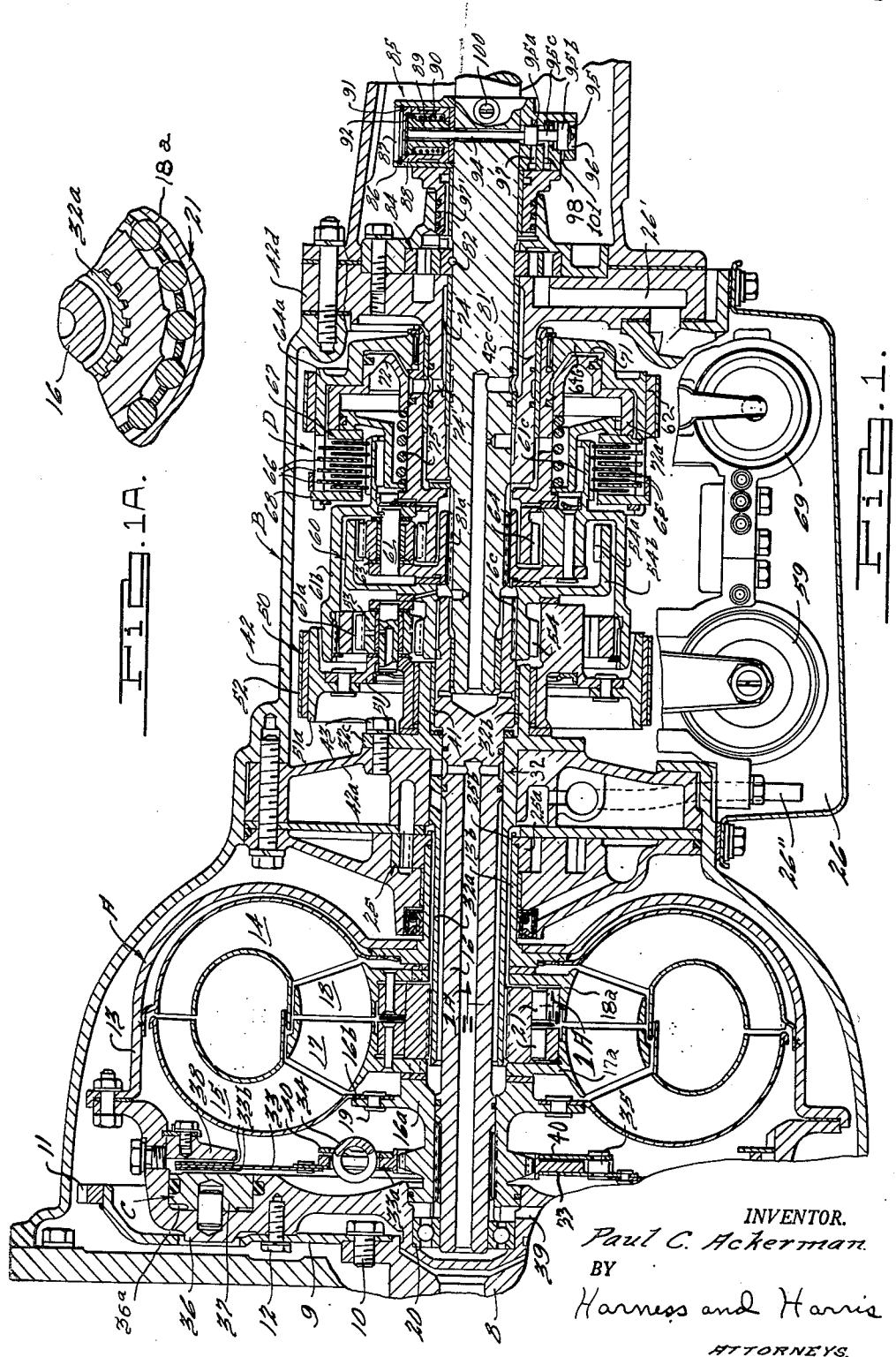
INVENTOR.
Paul C. Ackerman
BY
Harness and Harris
ATTORNEYS.

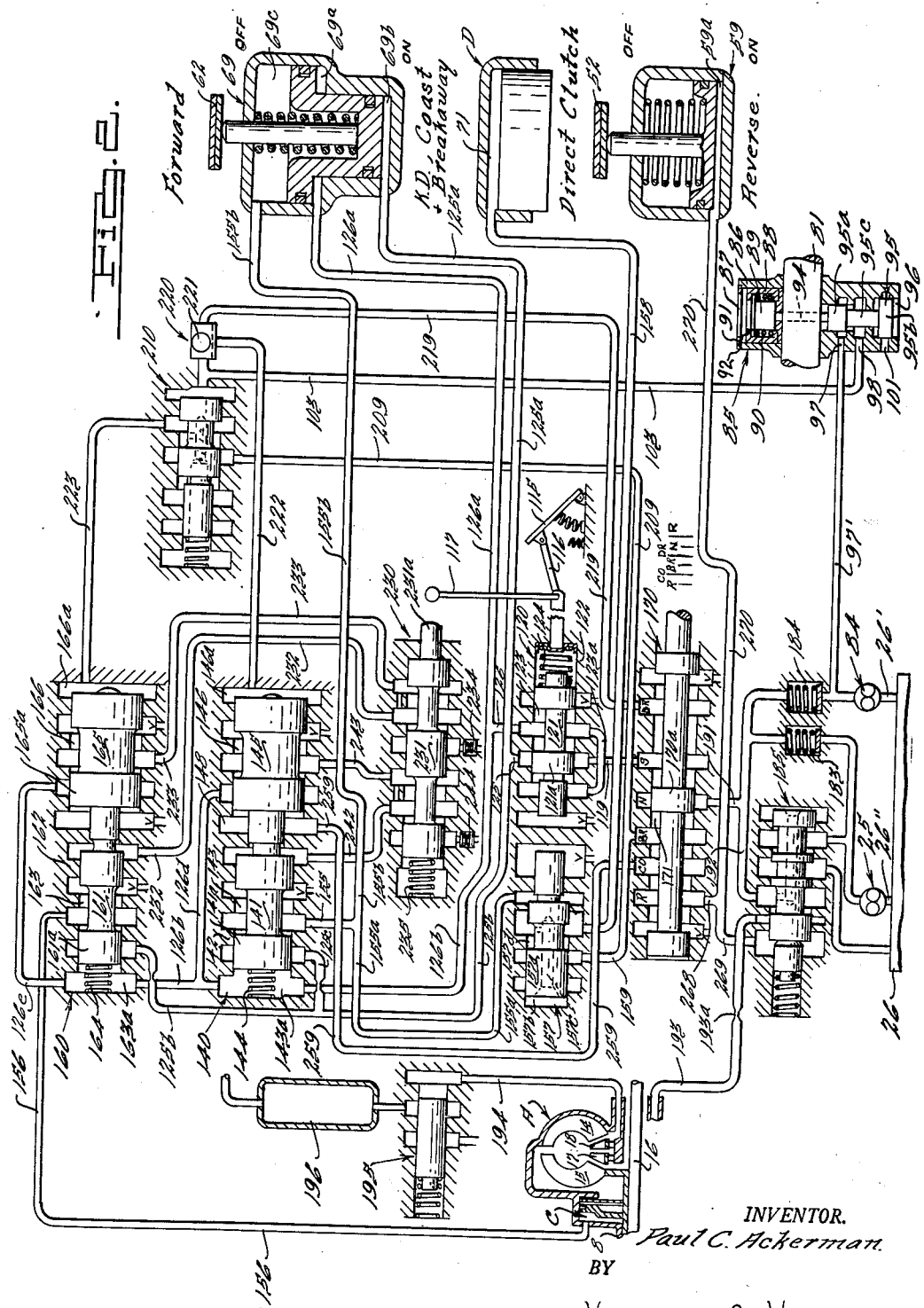

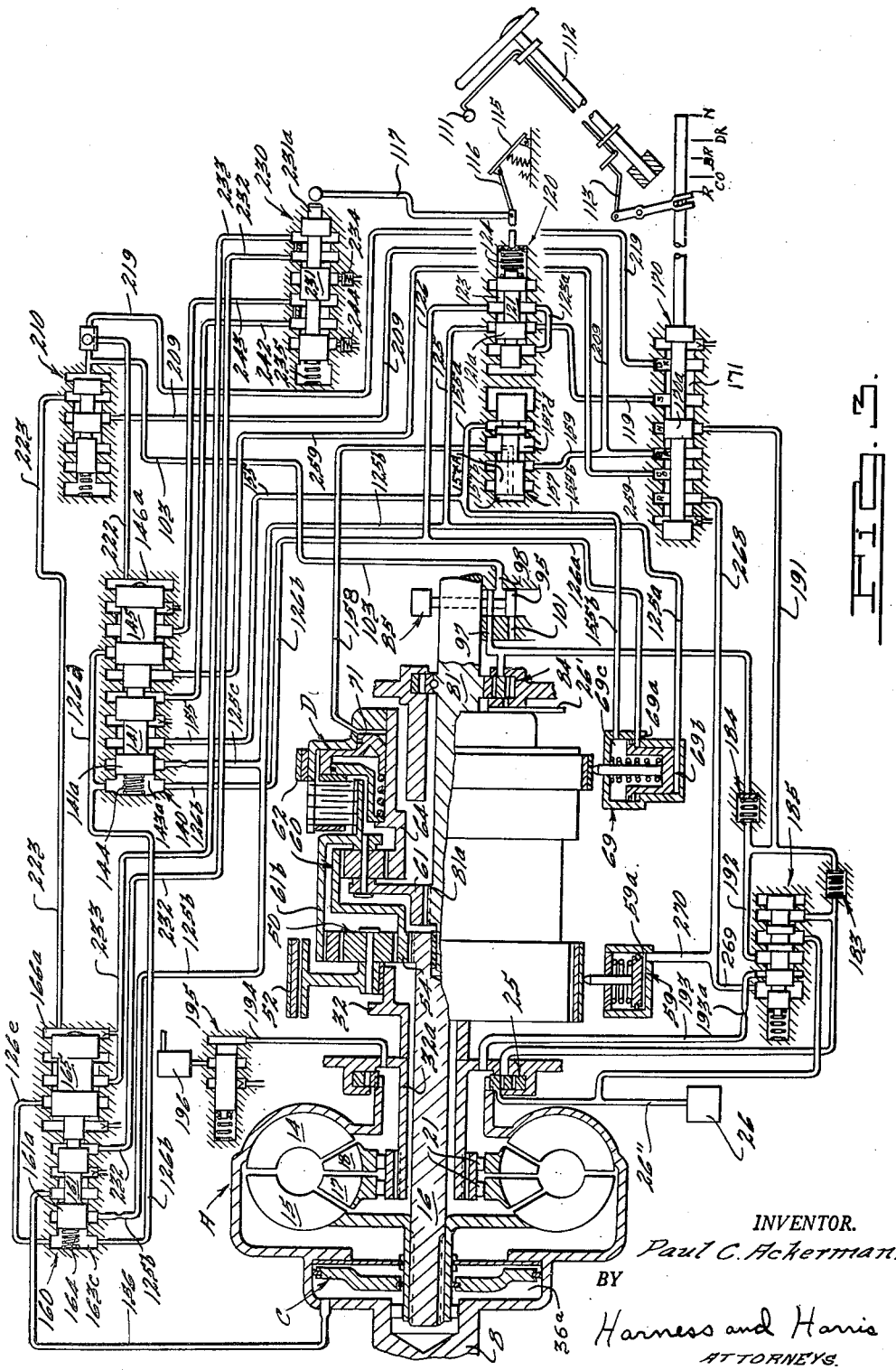

Patented Jan. 26, 1954

2,667,085

UNITED STATES PATENT OFFICE 2,667,085

HYDRODYNAMIC TRANSMISSION

Paul C. Ackerman, Detroit, Mich., assignor to Chrysler Corporation, Highland Park, Mich., a corporation of Delaware Application March 18, 1950, Serial No. 150,490

24 Claims. (Cl. 74—645)

This invention relates to a hydrodynamic power transmission unit comprising a hydrokinetic torque converter and a planetary gear box arranged in series and adapted to be drivingly connected in a plurality of different ways such that a plurality of different torque multiplying, starting, drive ratios are obtainable, each of which is adapted to be automatically converted into a positively connected direct drive for cruising purposes.

It is a primary object of this invention to provide a simplified, highly flexible, form of hydrodynamic power transmission unit having a plurality of different torque multiplying, starting, drive ratios, the transmission including suitable control means whereby each of the starting drive ratios is automatically convertible into a positively connected, efficient, direct drive ratio.

It is a further object of this invention to include in this transmission unit control means to automatically effect the upshifts and downshifts between each of the torque multiplying, starting, drive ratios and, in addition, manually or driver operable means to overrule the automatic control means whereby a downshift from the positively connected direct drive to the selected starting drive may be effected at the will of the operator.

It is another object of this invention to provide control means for a transmission of this type whereby the power transmission unit may be locked in a positively connected, torque multiplying, underdrive ratio so as to provide a drive ratio particularly adapted for coast braking purposes.

Other objects and advantages of this invention will become readily apparent from a reading of the attached specification and a consideration of the related drawings wherein:

Fig. 1 is a sectional elevation of a torque converter driven planetary gear type power transmission unit embodying this invention;

Fig. 1A is a sectional elevational view taken along the line 1A—1A of Fig. 1 disclosing the one-way brake structure associated with the converter guide wheels;

Fig. 2 is a diagrammatic view of part of the control system for this power transmission unit with certain portions thereof shown in sectional elevation; and Fig. 3 is a diagrammatic view of the complete control system for this transmission with certain portions thereof shown in sectional elevation.

Fig. 1 of the drawings discloses a power transmission unit comprising a hydrokinetic torque converter unit A arranged in series with and operatively connected to a planetary gear box B. Converter unit A is adapted to drivingly connect a prime mover such as a motor vehicle engine to the input to the planetary gear type torque transmitting and torque multiplying unit B. The reference numeral 8 represents an end portion of a driving member, such as the engine crankshaft of a motor vehicle power unit. The shaft 8 is drivingly connected to the rotatable, somewhat axially flexible, drive transmitting plate 9 by the screw means 10. The drive transmitting plate 9 has an engine starter ring gear 11 fixedly mounted about its periphery. Also drivingly connected to the drive plate 9 by the bolt means 12 is the torque converter casing 13 within which are mounted the various converter components, namely, the pump or impeller member 14, the turbine or runner member 15, and the guide wheels or reaction members 17 and 18.

The vaned impeller wheel 14 is fixedly connected to the converter casing 13 by welds, rivets or the like and is accordingly adapted to be rotatably driven by the driving shaft 8. The vaned turbine wheel 15 is mounted on and drivingly connected by rivet means 19 to a radially extending flange portion 16b formed on the shaft hub member 16a. Hub member 16a is drivingly connected to the forward end portion of the intermediate driven shaft member 16.

The intermediate shaft member 16 is adapted to transmit drive from the turbine member 15 of the torque converter unit A to the planetary gear unit B. Shaft 16 serves as the input to gear box B during power drive. The forward end of intermediate shaft 16 is journaled in the bearing 20 that is associated with the torque converter lock-up clutch C, which clutch is subsequently described in detail. The rear end portion of intermediate shaft 16 is rotatably supported by a sleeve-type of bearing 41 that is mounted in the fixed sleeve unit 32 carried by the housing 42 of the transmission unit B.

The vaned guide wheels 17 and 18 are rotatably supported within the converter casing 13 by their hub portions 17a and 18a respectively. The hub portions 17a and 18a are rotatably mounted, by means of the one-way brake devices 21, on the axially extending sleeve portion 32a of the fixed sleeve unit 32 (see Fig. 1A). Sleeve unit 32 is fixed to and projects from the wall 42a of the relatively stationary, gear box housing 42. The one-way brakes 21 are arranged such that they will permit only forward rotary movement (clockwise when looking from the converter A towards the gear unit B) to be transmitted to the guide wheels 17 and 18 by the rotation of the fluid in the converter. The brakes 21 continuously prevent rotation of the guide wheels 17 and 18 in a reverse or counterclockwise direction when looking rearwardly from the front end of the converter A.

The torque converter unit A includes a gear type oil pump 25 having a driving gear 25a that is directly connected by finger and slot means 25b to the axially extending flange portion 13b of the rotatable converter casing 13. The pump 25 draws oil from a sump 26 and circulates it through the converter unit A, the transmission lubricating system, and the various hydraulically operated control mechanisms associated with this transmission unit (see Figs. 2 and 3). A second gear pump 84, driven by the transmission output shaft 81, is also included in this transmission to provide a source of pressure fluid for the various hydraulically operated devices associated with the transmission unit. Rear pump 84 is operable even when the engine is not driving the pump 25. The operation of this pair of pumps driven by the input shaft 8 and output shaft 81 respectively is subsequently explained in greater detail.

In order to provide means for transmitting a positive, two-way, direct drive from the driving shaft 8 to the intermediate shaft 16 a torque converter lock-up clutch C is provided. The lock-up clutch C includes the radially extending drive transmitting disc 33 which has friction elements 33b mounted on its side faces adjacent its periphery. Drive transmitting disc 33 is drivingly connected by hub portion 33a to the shaft 16 through the shaft hub member 16a. Mounted between the disc 33 and the disc hub member 33a are several circumferentially extending, spaced, compression spring elements 34 (only one shown) that cushion the torque impact transmitted to the disc 33 on engagement of the clutch C. Springs 34 also serve to damp out vibrations of the disc 33. Springs 34 thereby facilitate smooth engagement of the clutch C. Pins 35 are arranged to extend between the disc 33 and the clutch disc anchor plate 40 through enlarged openings in the hub member 33a. Pins 35 provide an additional means to connect the disc 33 and hub member 33a in the event of failure of the springs 34. Pins 35 also urge the disc 33 and anchor plate 40 against the sides of the hub member 33a and thereby tend to damp out vibrations of the disc 33. Cooperatively associated with the drive transmitting disc 33 is a driving plate 36 that is assembled as a part of the torque converter casing 13. Plate 36 has a piston bore 36a formed therein adjacent its periphery. Mounted within the piston bore 36a is an axially shiftable, hydraulically actuated annular piston 37. Plate 36 also supports a clutch backing plate 38 which is arranged to cooperate with the piston 37 to provide means to clampingly engage the friction faces 33b therebetween and thus positively transmit drive between shafts 8 and 16 when pressure fluid is admitted to the piston bore 36a. Pressure fluid may be introduced to the bore 36a through the bore 39 in the clutch driving plate 36. Admission of pressure fluid to the piston bore 36a in plate 36 will move the piston 37 rearwardly so as to engage the torque converter lock-up clutch C and directly connect the driving shaft 8 to the intermediate shaft 16. On release of the pressure fluid from the piston bore 36a suitable spring means (not shown) and the pressure of the fluid within the converter casing 13 will urge the piston 37 forwardly to disengage the clutch C and provide a means for the transmission of a fluid transmitted, torque multiplying drive from shaft 8 through the fluid operated torque converter A to the associated intermediate driven shaft 16.

The gear box B includes the planetary gear trains 50, 60, which provide means for the transmission of torque multiplying reverse and forward drives respectively. The gear box housing 42 includes the forward wall portion 42a to which is connected by bolt means 43 a radially extending flange 32c of the axially extending hollow sleeve member 32. The axially extending rear portion 32b of sleeve 32 provides a journal support for the planet pinion carrier member 51 of the reverse drive planetary gear train 50.

Reverse planetary gear train 50 includes the planet pinion carrier 51 which is formed with an axially extending peripheral drum portion 51a adapted to be engaged by the braking band 52. Band 52 is actuated by servo unit 59. Rotatably mounted on carrier 51 are a plurality of planet pinions 53, only one of which is shown in Fig. 1. The teeth of planet pinions 53 drivingly mesh with the external teeth of the sun gear member 54. Sun gear member 54 is drivingly connected at 16c to the rear end portion of the torque converter turbine driven shaft 16. The teeth of planet pinions 53 are also in meshing engagement with the internal teeth 61a formed on the drum-like extension 61b of the planet carrier 61 of the forward drive planetary gear train 60. The drum member 61b, while forming the annulus gear of the reverse drive planetary gear train 60, is supported by and also forms a part of the planet carrier 61 of the forward drive planetary gear train 60. Carrier 61 is drivingly connected to the output shaft 81 by the splines 81a.

Forward drive planetary gear train 60 includes the planet pinion carrier 61 which is splined to and supported by the output shaft 81. Planet pinions 63 (only one shown), which are rotatably mounted on planet carrier 61, have teeth meshingly engaged with internal teeth 54a on the rearwardly projecting drum-like flange portion 54b of sun gear 54 of the reverse drive planetary gear train 50. This internally toothed portion 54b of the reverse drive planetary sun gear 54 thus forms the annulus gear of the forward drive planetary gear train 60. The teeth of pinions 63 also meshingly engage external teeth on the sun gear 64 which gear is journaled on the axially extending sleeve 42c carried by the rearwardly located gear box housing wall 42d. Sun gear 64 also mounts a brake drum engageable portion 64a. Braking band 62 is adapted to be applied to the peripheral portion of brake drum 64a to anchor the sun gear of the forward drive planetary gear train 60 against rotation. Band 62 is actuated by the servo unit 69.

It will be noted that the input to either of the planetary gear trains 50 or 60 is always through the driven sun gear member 54 and associated flange 54b which gear member and associated flange 54b are drivingly connected at 16c to the intermediate driven shaft 16. The output from either of the planetary gear trains 50 or 60 is always through the planet pinion carrier 61 which is splined to the output shaft 81. Drive from sun gear 54 through the several planetary gear trains to the output shaft 81 is controlled by the application of the several braking bands 52, 62 of the planetary gear trains 50, 60, which bands are operated by the servo mechanisms 59 and 69 respectively.

In addition to providing a means for the transmission of a combination fluid and mechanically transmitted, torque multiplying, forward drive from shaft 8 through the series arranged torque converter A and the planetary gear train 60 to output shaft 81, this transmission unit includes means whereby the planetary gear train 60 may be by-passed and a purely fluid generated, torque multiplying forward drive transmitted directly from the driving shaft 8 through the torque converter A to the output shaft 81. The means for accomplishing this fluid transmitted and generated, torque multiplying, forward drive includes the planetary direct drive clutch mechanism D. This planetary direct drive clutch D is arranged to directly connect the intermediate driven shaft 16 to the output shaft 81.

Clutch mechanism D includes the rotatable gear member 64 having the pressure cylinder bore 71 formed therein. Bore 71 results from the dishlike shape of sun gear member 64 and its drumlike extensions 64b and 64a respectively. Reciprocably mounted in the cylinder bore 71 is the direct drive clutch actuating piston 72. Piston 72 is adapted to be moved forwardly by the admission of pressure fluid to the cylinder bore 71 through the pressure fluid inlet bores 74', 74. Piston member 72 has a finger portion 72a that is adapted to be moved into engagement with the axially movable clutch pressure plate 67 so as to clampingly and drivingly engage the clutch discs 65, 66 between the pressure plate 67 and the backing plate 68. Friction surfaced clutch discs 65 are drivingly mounted on the axially extending flange 61c that projects from the pinion carrier 61. The cooperating clutch discs 66 are drivingly connected to the axially extending flange 64a that forms a part of the sun gear 64. When clutch discs 65 and 66 are drivingly engaged the planetary gear train 60 is locked up and a direct drive is transmitted from the input gear 54a and its driving shaft 16 to the output shaft 81. The pressure plate 67 and the backing plate 68 are both drivingly connected to the flange portion 64a of the sun gear member 64 in conventional manner. A compression spring member 75 that extends between the piston 72 and a portion of the sun gear 64 normally urges the piston 72 to its rearwardly positioned, clutch disengaged, position. The specific clutch construction herein disclosed includes centrifugal pressure compensating means to prevent accidental engagement of clutch D. The clutch D is specifically described and claimed in the co-pending application of Erik Quistgaard et al., Serial No. 140,456, filed January 25, 1950. In operation of the clutch mechanism D pressurized fluid from the rear, output shaft driven, pump 84 is directed into the cylinder bore 71 through the inlet bores 74, 74' to cause engagement of the clutch discs 65 and 66.

With the power transmission unit herein disclosed it is possible to initiate forward drive through either of two torque multiplying, drive ratios both of which are automatically convertible into a positive, two-way, direct drive. The positive direct drive is not transmitted through the fluid of the torque converter A, therefore the slip of the torque converter is eliminated, thus an improved fuel economy as well as improved engine braking is available in the cruising direct drive range.

The two forward drive ratios available for initiating forward drive with this power transmission unit will for the sake of convenience be referred to as the Breakaway ratio and the Drive ratio. Breakaway ratio is normally used when an exceptionally fast getaway is desired as when crossing a busy intersection, or the like. Drive ratio is preferably used for all normal starting drive where the exceptionally fast Breakaway ratio acceleration is not absolutely necessary. However, even when starting through the Drive ratio the torque multiplying effect of the converter A is available for initiating drive and this accelerating effect is more than adequate to meet all normal requirements.

When forward drive is to be initiated through the Drive ratio the torque converter lock-up clutch C is disengaged, the planetary direct drive clutch D is engaged, and both brake bands 52 and 62 are in disengaged positions. With the power transmission unit so conditioned, as the engine driven shaft 8 is speeded up a hydraulically generated, torque multiplying drive is transmitted from the converter turbine driven shaft 16 to the annulus gear flange portion 54a of the forward planetary gear train 60. As direct drive clutch D is applied, the gear train 60 is locked up and it directly transmits this converter generated torque multiplying drive to the output shaft 81 by way of the planet carrier 61 of planetary gear train 60. The carrier member 61 is drivingly connected to output shaft 81 as previously described. Acceleration through this torque converter generated, torque multiplying ratio continues until certain output shaft speed and torque conditions are attained and then the transmission control system, that is subsequently described in detail, automatically effects engagement of the torque converter lock-up clutch C. Upon engagement of lock-up clutch C the driving shaft 8 is directly connected to the shaft 16, and as shaft 16 is directly connected to the output shaft 81 by the engaged direct drive clutch C, it is obvious that the power transmission unit is now positively transmitting drive at a 1:1 ratio through mechanically connected driving elements that will not normally slip during either power or coast drive or during engine braking. As the torque multiplication factor of the converter unit A is in the nature of 2 or 2.5 to 1 at stall, it is obvious that this ratio times the axle ratio of 3.3 or 3.9 to 1 gives an overall accelerating ratio of between 6.6 to 9.8. Such overall ratios are more than adequate for normal acceleration with the powerful engines now used in motor vehicles.

Whenever forward drive is to be initiated through the Breakaway ratio the clutches C and D are initially disengaged and braking band 62 is applied to the drum portion 64a of the sun gear 64 of forward drive planetary gear trains 60. As the driving engine is speeded up to drive input shaft 8 at an increased speed, a combination fluid and mechanically generated, torque multiplying, underdrive is provided. This accelerating underdrive is from input shaft 8 through the torque converter A and the turbine driven intermediate hollow shaft 16 to the annulus gear portion 54a of gear member 54. As band 62 is applied, the driven annulus gear 54a drives the pinion carrier 61 of gear train 60 forwardly at a torque multiplying ratio. As the pinion carrier 61 is directly connected to the output shaft 81 through the splines 81a a combination fluid and mechanically generated, torque multiplying underdrive is transmitted from converter A through forward drive train 60 to the output shaft 81 whenever drive is initiated through the Breakaway ratio. Acceleration through the combination fluid and mechanically generated, torque multiplying, Breakaway drive train continues until certain output shaft speed and torque conditions are achieved and then the transmission control system, subsequently described in detail, causes the torque converter lock-up clutch C to be automatically engaged to provide for the direct transmission of drive from shaft 8 to shaft 16 to the input annulus gear 54a of the forward drive planetary 60. Acceleration after the converter clutch C is engaged is thereafter by way of the mechanical torque multiplying gear train 60. At some other predetermined conditions of output shaft speed and torque the transmission control system (Figs. 2 and 3) causes the band 62 to be disengaged and the planetary direct drive clutch C to be applied to then convert the mechanically generated, torque multiplying underdrive into a positively connected, two-way direct drive. Release of band 62 and engagement of clutch D provides for the transmission of a direct drive from input shaft 8 through clutch C to the intermediate driven shaft 16 which latter shaft is directly connected to the output shaft 81 by the direct drive clutch D. With the Breakaway drive ratio hereinabove described it is possible to get exceptional accelerating power for the torque multiplication ratio of 2 or 2.5 to 1 of the converter is combined with the torque multiplying ratio of approximately 1.5 of the planetary gear train 60 and these ratios combine with the axle ratio of 3.3 or 3.9 to 1 to give an overall ratio of between 9.9 and 14.7 to 1. It is thought to be quite obvious why the Breakaway ratio gives rocket-like acceleration when associated with one of the current high powered motor vehicle engines.

Reverse drive may be obtained by applying brake band 52 to the drum portion 51a of carrier member 51 of the reverse planetary gear train 50, the clutches C and D and band 62 being disengaged at this time. Drive from input shaft 8 is then transmitted through the torque converter A to turbine driven intermediate shaft 16. Shaft 16 drives the sun gear 54 of the reverse planetary train 50 forwardly while carrier 51 is being held by brake band 52 therefore a combination fluid and mechanically transmitted torque multiplying reverse drive is transmitted to the annulus gear portion 61a of planet pinion carrier 61. As carrier 61 is directly connected to the output shaft 81, a combination fluid and mechanically generated, torque multiplying reverse drive is transmittable from the input shaft 8 through the converter A and gear train 50 to the output shaft 81.

The control system for operation of the several brake bands 52, 62 as well as the torque converter lock-up clutch C and direct drive clutch D is diagrammatically shown in Figs. 2 and 3. Drivingly connected to the output shaft 81 (see Figs. 1 and 3) by the pin 82 is a second gear type oil pump 84. Oil pump 84 is arranged to draw fluid from the oil sump 26 through conduit 26' and to circulate this pressurized fluid through the torque converter A and the hydraulically operated control and lubrication systems of the transmission unit whenever the output shaft 81 is rotating above a certain speed. Consequently, pump 84 provides pressure fluid for operation of the transmission unit during a pushed or towed start even if engine driven pump 25 is inoperative due to the engine being dead or the like. Suitable controls such as the arrangement shown in Figs. 2 and 3, and subsequently described in detail, are provided to insure that pump 84 automatically takes over the supply of pressure fluid for the transmission unit control and lubricating systems whenever the speed of output shaft 81 exceeds a certain predetermined relatively low value. This relieves the transmission driving engine of the load of front pump 25 after the engine unit has begun to drive the transmission output shaft 81.

Also drivingly mounted on the output shaft 81 (see Figs. 1 and 2 particularly) is a speed responsive, centrifugal force operated, governor mechanism 85 which provides one of the means for automatically controlling operation of this transmission unit. It is obvious that various types of speed and torque responsive controls may be used with this transmission but the specific governor mechanism 85 herein disclosed is particularly advantageous due to its simplified design and novel manner of operation. This governor unit is arranged such that it does not require shaft driven gearing or electrically operated control units. Instead, this governor uses hydraulic pressure fluid supplied by the rear pump 84 in combination with the centrifugal force effect of a pair of output shaft mounted telescopically arranged weights 88, 89 for controlling actuation of the radially movable governor control valve 95 to provide a novel type of governor mechanism.

The governor 85 comprises the radially extending body portion 86 having a cylindrical bore 87 extending radially inwardly from one end thereof. Reciprocably mounted in the bore 87 are the cylindrical primary and secondary weights 88 and 89 respectively, which weights are telescopically arranged for movement relative to each other. Extending between the spaced apart end flanges on the weights 88 and 89 is a preloaded compression spring 90 that tends to urge the weights 88 and 89 apart. A snap ring 91 mounted in the bore 87 of valve body 86 provides a seat for the primary weight 88 when it is moved outwardly a predetermined distance by centrifugal force due to the rotation of driven output shaft 81. Mounted in the bore in primary weight 88 is a snap ring 92 that provides a seat for the secondary weight 89 on the primary weight 88. Extending through aligned bores in the secondary weight 89 and the driven output shaft 81 is a tie shaft 94 that has one end suitably anchored to the secondary weight 89 by means of a snap ring or the like. The other end of tie shaft 94 has mounted thereon the piston type governor control valve 95. The governor valve 95 is arranged to reciprocate in the T-shaped bore 96 in the valve body 86. Governor piston valve 95 has spaced lands 95a and 95b of different diameters connected by a narrow neck portion 95c. Extending through the valve body 86 transversely to bore 96 and intersecting bore 96 are the pressure fluid inlet and outlet passages 97 and 98 respectively. Passage 97 is arranged to be connected by suitable conduit means 97' to the outlet from rear oil pump 84. The pressure fluid from pump 84 is thus applied through inlet passage 97 to the stem portion of valve bore 96. The outlet passage 98 from the stem portion of the piston bore 96 is connected to an outlet conduit 103 (see Figs. 2 and 3). The conduit 103 conducts the pressure fluid discharged from the piston valve bore 96 to the governor compensator 210 that is subsequently described. Valve body 86 also includes a relief port 101 to relieve the excess pressure of the fluid in bore 96 of the governor unit 85. Relief port 101 also acts as a means to balance the valve 95 in the bore 96 when it is acted on by the weights 88, 89 and the pressure fluid in bore 96. The valve body 86 is fixedly connected to the driven output shaft 81 by the set screw 100. The governor tie shaft 94 is of such size as to be freely slidable in its shaft receiving bore through output shaft 81 and is not required to serve as a means for fastening the governor body 86 to the output shaft 81.

The governor 85, which functions as a fluid pressure reducing valve, receives fluid under pressure from the rear pump 84 as soon as output shaft 81 begins to rotate. This pressure fluid from pump 84 is admitted to the valve bore 96 through the inlet passage 97 and a hydraulic pressure is applied to the opposed inner surfaces of valve lands 95a and 95b. As land 95b is larger in diameter than land 95a there is an unbalanced area which causes an unbalanced force to be applied to piston valve 95 which force tends to move valve 95 radially outward so as to cause valve land 95a to close off the pressure fluid inlet passage 97. Due to the rotation of output shaft 81 there is also a simultaneously acting centrifugal force tending to urge the primary and secondary weights 88, 89 radially outward. As tie shaft 94 connects weights 88 and 89 to piston valve 95 it is obvious that the centrifugal force of the weights 88 and 89 and their connecting spring 90 is opposed by the hydraulic pressure applied to the unbalanced area of the piston valve land 95b. Consequently the centrifugal force of the elements 88, 89, 90 tends to move valve 95 so as to uncover the passage 97 and connect the pressure fluid inlet passage 97 to the valve bore 96 and outlet passage 98 while the unbalanced hydraulic force applied to piston valve land 95b tends to shift valve 95 in the opposite radial direction so as to close off the connection between inlet passage 97 and the valve bore 96 and outlet 98.

The pressure fluid that is admitted to valve bore 96 is conducted through the outlet passage 98 to other parts of the control system to actuate the various control devices that are subsequently described in detail. If the pressure of the fluid admitted to the bore 96 from inlet 97 becomes excessive and exceeds the centrifugal force of the elements 88, 89, 90 then valve 95 will move radially outward a sufficient amount to uncover the relief port 101 and the pressure fluid in the stem portion of bore 96 will spill out and reduce the pressure of the contained fluid to a value where a condition of equilibrium will again be set up between the centrifugal force of the elements 88, 89, 90 and the unbalanced force applied to the valve land 95c. A more complete description of the operation of this governor device 85 is set forth in the co-pending application of William L. Sheppard, Serial No. 98,493, filed June 11, 1949.

While the pressure of the fluid discharged from the pump 84 into the governor inlet passage 97 is almost constant and also greater than the pressure of the fluid discharged from the governor valve bore 96 into the outlet passage 98, due to the reducing valve action of piston valve 95, still, it is thought to be obvious that the pressure of the fluid discharged from the governor 85 is roughly proportional to the speed of the output shaft 81 and that governor 85 provides an efficient, simplified form of speed sensitive control mechanism.

The control system (see Figs. 2 and 3) for this transmission includes the manually operable drive selector lever 111 which is rotatably mounted on the conventional motor vehicle steering column 112. Control lever 111 is connected by suitable linkage 113 to the manually operable drive ratio selector valve 170. Valve 170 has five drive ratio positions which are presented in the drawings by the letters R, CO, BR, N and DR respectively. These letters correspond to the Reverse, Coast, Breakaway, Neutral and Drive ratios which ratios are selectively obtainable by manual shift of selector lever 111. The letter V associated with the valve 170, and with the other valves of this control system, denotes a vent or drain port for returning pressure fluid to the supply sump 26. Pressure fluid from either of the supply pumps 25 or 84 is directed into the main supply conduit 191 which is connected to and supplies pressure fluid to the manually operable drive ratio selector valve 170. The pressure of the fluid in conduit 191 is controlled by the pressure regulator valve 185. Check valves 183 and 184 maintain a closed pressure fluid supply system. On admission of pressure fluid to the bore 171 of drive ratio selector valve 170 certain of the control mechanisms associated with the control system will be energized and one or the other of the several drive ratios will be activated as will be more fully explained. When the manual valve 170 is located in the Neutral position the valve land 170a closes off the port connecting supply conduit 191 to valve bore 171 and obviously pressure fluid cannot pass through valve 170 to activate any of the drive ratio selector mechanisms. However, when the manually controlled valve 170 has been placed in the Neutral position and the vehicle engine is running or the vehicle is being pushed or towed so that one or the other of pumps 25 or 84 is operating, then pressure fluid will be directed through conduit 192 to the pressure regulator valve 185 and through valve 185 to the conduit 193 that supplies pressure fluid to the converter A. Conduit 193 may contain a reduced portion 193a that acts as a flow control for the pressurized fluid directed into the converter A. Pressure fluid passing through converter A is returned to sump 26 and to the lubrication system by the conduit 194 that has associated therewith the converter pressure regulator valve 195 and the pressure fluid cooling unit 196. The converter pressure regulator valve 195 preferably maintains a pressure of approximately 40 to 50 p. s. i. in the converter so that the clutch C may be easily operated by normal line pressure of 80–90 p. s. i.

In any forward drive ratio position of the selector valve 170 pressure fluid from supply conduit 191 will always be directed through the supply port S of valve 170 and into the conduit 119 that connects the manual drive ratio selector valve 170 with the torque regulating or torque responsive throttle valve 120. Consequently a torque responsive control is always available to cooperate with the speed responsive governor 85 to control automatic operation of this transmission unit in all forward drive ratios.

The torque responsive throttle valve 120 (see Figs. 2 and 3) has operably associated therewith the kickdown valve 231 which is hereinafter described. The torque responsive throttle valve 120 is operated by the conventional throttle control or accelerator pedal 115 for the engine unit (not shown) that drives this power transmission unit. Pedal 115 is connected to the piston throttle valve 121 by the linkage 116. Throttle valve piston 121 is arranged to reciprocate in the bore 123 of the valve cylinder body 122 and is connected to the accelerator pedal 115 through a compression spring 124. At closed throttle position of the accelerator pedal 115 with the manual control valve 170 set for any of the forward drive ratios denoted by CO, BR or DR, the arrangement of valve 120 is such as to pressurize conduit 125 and branch conduits 125a, 125b and 125c with pump pressure fluid from supply conduits 191 and 119. Admission of pump pressure fluid to branch conduit 125a applies pressure fluid to the chamber 69b on the apply or on side of servo 69 and tends to cause application of brake band 62 to drum member 64a to condition the transmission for the accelerating, combination fluid and mechanically generated, torque multiplying Breakaway underdrive. Torque converter lock-up clutch C is disengaged at the beginning of all forward drive for the positions of throttle valve piston 121 and lock-up clutch shift valve piston 161 at closed throttle are such as to prevent pressure fluid from conduits 125 and 125b from entering conduit 156 to effect engagement of the converter lock-up clutch C. At closed throttle the land 121a of throttle valve 121 is positioned so as to substantially close the pressure fluid inlet port to valve bore 123 from supply conduit 119 and prevent the pump pressure fluid or so-called line pressure fluid (approximately 90 p. s. i.) in supply conduit 119 from being transmitted to the bore 123 of the valve cylinder 122. At closed throttle there is however sufficient preload on spring 124 to shift valve 123 to the left a sufficient amount to permit seepage of a certain amount of pressure fluid from conduit 119 around valve land 121a into bore 123 to develop about 20 p. s. i. pressure in bore 123 and in the conduit 126 connected thereto. Branch conduit 126a connected to conduit 126 conducts pressure fluid to the chamber 69a on the apply side of servo 69 to assist in application of brake band 62. Branch conduit 126b that is also fed by conduit 126 communicates with the pressure chamber 143a at one end of the bore 143 in the cylinder body 141 of the direct clutch automatic control valve mechanism 140. The seepage into conduit 126 from conduit 119 through valve 120 at closed throttle position of the throttle valve 121 transmits sufficient pressure fluid to the chamber 143a of the valve 140 to prevent the direct drive clutch D from being applied whenever the Breakaway drive ratio is used for initial acceleration. As the accelerator pedal 115 is depressed from its closed throttle position to initiate vehicle acceleration the throttle valve 121 is moved to the left and this movement is transmitted by spring 124 to throttle valve 121 which latter valve is moved to the left a sufficient amount to uncover the line pressure inlet port to bore 123 from supply conduit 119 and admit pressure fluid from conduit 119 to the bore 123 of the cylinder 122 and to supply conduit 126. The pressure fluid admitted to bore 123 from supply conduit 119 on partial depression of the accelerator pedal 115 is of a lower pressure than the line pressure in conduit 119 due to the reducing valve action of the valve land 121a of the throttle valve 121. The pressure of the fluid admitted to the bore 123 of valve 120 by the reducing valve action of valve land 121a is hereafter referred to as throttle pressure. At wide open throttle with pedal 115 substantially depressed there is substantially a direct connection between conduit 119 and the supply conduit 126 consequently the throttle pressure in conduit 126 will equal the line pressure in conduit 119. The admission of throttle pressure fluid to bore 123 of cylinder 122 has a tendency to shift the throttle valve 121 to the right to oppose depression of the accelerator pedal for it will be noted that a by-pass bore 123a connects the main bore 123 with the chamber on the opposite side of valve land 121a so the throttle pressure fluid in bore 123 is applied to the left end of valve land 121 whereby throttle pressure reacts against the left end of throttle valve 121 and tends to urge the valve 121 to the right to balance the force being applied to the right end of valve 121 by the accelerator pedal 115.

The throttle pressure fluid admitted to conduits 126, 126b and to valve chamber 143a of the automatic control valve unit 140 for clutch D, during initial depression of the accelerator pedal 115, when valve 170 is set for a forward drive ratio such as Breakaway, applies throttle pressure to the chamber 143a at the left end of direct clutch shift valve 140 and to the chamber 163a at the left end of converter lock-up shift valve 160. The throttle pressure in chambers 143a and 163a assists the springs 144 and 164 in urging shift valves 141 and 161 to positions towards the right end of valve cylinders 161 and 162 (as in Figure 2) which are the downshifted positions of the valves 141 and 161. Thus during initial depression of accelerator pedal 115 the valve lands 141a and 161a of shift valves 141 and 161 are positioned so that they cover the line pressure inlets from supply conduits 125c and 125b to valve bores 143 and 163 respectively. This prevents line pressure from supply conduit 125 from passing through the clutch control valves 140 and 160 and into conduits 155 and 156 respectively to effect engagement of the converter lock-up clutch C and the direct drive clutch D. Conduit 155 includes a branch conduit 155b that is adapted to transmit line pressure (approximately 90 p. s. i.) to the chamber 69c on the band release or off side of the servo 69 that controls the forward drive planetary gearing 60. Thus it will be seen that the positions of the shift valves 141 and 161 control engagement and disengagement of the converter lock-up clutch C and the direct drive clutch D as well as the engagement and disengagement of the actuating brake band 62 of the forward drive planetary gearing 60.

Conduit 155 also includes a branch conduit 155a that is connected to the direct drive clutch pressure compensator unit 157. Compensator unit 157 is connected to the bore 71 of the direct drive clutch D by the conduit 158. The pressure fluid that is passed through the compensator unit 157 is directed to clutch D by conduit 158 to engage the clutch D. The compensator 157 provides for the application of two different pressures to the direct drive clutch bore 71 depending on whether the transmission unit is set for the Drive ratio or the Breakaway ratio. When the drive ratio selector valve 170 is set for Drive then line pressure fluid of approximately 90 p. s. i. is conducted to the compensator 157 by conduit 155a after the direct clutch shift valve 141 has upshifted to the left. This line pressure of 90 p. s. i. in conduit 155a is applied to the right end of reciprocable valve 157a and it forces valve 157a to the left to permit the line pressure in conduit 155a to pass through compensator 157 to the conduit 158 and to clutch D to effect engagement thereof. Conduit 159 does not contain pressure fluid when the transmission is set for Drive so there is no modification or compensation of the line pressure in conduit 155a that is used to apply the clutch D when operating in the Drive ratio. However, when the manual drive ratio selector valve 170 is set for Breakaway then the conduit 159 contains line pressure and when the direct clutch shift valve 141 upshifts, the line pressure in conduit 155a urging valve 157a to the left is opposed by a lesser, compensated pressure in chamber 157b of valve 157. The pressure in chamber 157b results from the bleeding of line pressure from conduit 159 to the chamber 157b through valve bore 157c as the valve 157a is moved to the left and cracked open to permit line presure from conduit 159 to enter the bore 157d of the compensator unit 157. The compensator unit 57 thus acts as a pressure reducing valve when the selector valve 170 is set for Breakaway and it directs a compensated pressure fluid with a maximum pressure of approximately 80 p. s. i. to the clutch D to effect engagement thereof when operating in the Breakaway ratio. The reason these two different clutch applying pressures are used to effect engagement of clutch D when operating in the Drive and Breakaway ratios is that when the transmission is set for Drive ratio the clutch D is engaged at the time drive is initiated and therefore clutch D must transmit the full torque multiplication of the converter A which may be as much as three times the direct drive torque. Accordingly, the higher applying pressure, that is full line pressure (90 p. s. i.), is used to apply clutch D during drive through the Drive ratio. However, when the selector valve 170 is set for initiation of drive through the Breakaway ratio, the clutch D is not applied until after the torque converter has been locked-up by the engagement of clutch C so the direct drive clutch D is not required to transmit a multiplied torque drive and thus a somewhat reduced line pressure of about 80 p. s. i. or less is now adequate to engage the clutch D. The reduced clutch applying pressure tends to give smoother clutch operation therefore it is quite advantageous.

After the drive ratio selector valve 170 has been moved from the Neutral position to the selected Drive or Breakaway position for initiating forward drive, the control valving will have applied the appropriate clutches and/or bands and then depression of the accelerator pedal 115 will cause drive to be transmitted to the output shaft 81. Obviously until the initiation of drive, the governor 85 is not providing a speed responsive controlled governor pressure fluid for the conduit 103 so the clutch control valves 141 and 161 are in their downshifted positions at the right sides of the control valve units 140 and 160 respectively, as shown in Figs. 2 and 3. Until a pressure fluid such as governor pressure is applied to the right ends of the pilot valves 145 and 164 the shift valves 141 and 161 cannot be shifted to the left to their upshifted positions. However, as the output shaft 81 begins to gain speed, due to depression of accelerator 115, a variable governor pressure is directed to the governor pressure supply conduit 103 and this governor pressure in conduit 103 will attempt to bring about the upshift of the clutch shift control valves 141 and 161. This governor pressure in conduit 103 will tend to apply a fluid pressure generated upshifting force to the right end of each of the clutch pilot valves 145 and 165. Pilot valves 145 and 165 are reciprocably mounted in the bores 146 and 166 of valve units 140 and 160 and are adapted to be moved leftwardly into engagement with the shift valves 141 and 161 to effect upshift of valves 141 and 161 towards the left. Due to the governor pressure compensator 210 and its associated selector valve 220 it is possible to apply different pressures to the chambers 146a and 166a at the right end of valves 140 and 160 and thus have different points of engagement for the converter lock-up clutch C and the direct drive clutch D when drive is initiated through the Breakaway drive ratio. This is necessary when the transmission is set for the Breakaway forward drive ratio for it is advantageous to have the torque converter clutch C lock-up the torque converter at a lower vehicle speed than that which effects lock-up of the direct drive clutch D of the planetary gearing 60. By this arrangement a step-by-step upshift from a drive train comprising converter A plus gear train 60, to the gear train 60 alone, to direct drive in three unnoticed steps is obtainable.

The governor pressure compensator 210 functions similarly to the direct clutch compensator 157 in that it modifies the line pressure transmitted to the compensator 210 by the conduit 209. Instead of applying governor pressure from conduit 103 directly to the chamber 166a at the right end of converter lock-up clutch control valve 160, it is possible, by virtue of the compensator 210 and valve 220, to apply either governor pressure or a higher modulated pressure that is proportional to the governor pressure, to the chamber 166a of converter clutch control valve 160. These two different pressures that are applied to the pilot valve 165 of valve 160 bring about two different points at which the converter lock-up clutch C will be engaged depending on whether the manual drive ratio selector valve 170 is set for the Breakaway ratio or the normal forward starting Drive ratio. The reason for the two different engagement points of converter lock-up clutch C is that when the transmission is set for Drive the complete torque multiplication of the power transmission unit must be supplied by the converter A, as the gear box B has the torque multiplying gearing 60 locked up during the Drive ratio. Accordingly, the converter A must be active over a longer period of time in the Drive ratio than when the transmission is set for the Breakaway ratio where the gearing 60 will provide some torque multiplication even after the converter A has been locked up by engagement of the clutch C. Thus a relatively low pressure, that is, direct governor pressure is applied to the pilot valve 165 of converter clutch control valve unit 160 to effect leftward shift thereof when operating in the Drive ratio whereas when operating in the Breakaway ratio the compensator 220 applies a relatively high compensated line pressure from conduit 209 to the pilot valve 165 to effect upshift thereof. Obviously when the higher compensated pressure is applied to valve 165, the upshift to lock-up converter clutch C will occur at a lower vehicle speed than when the lower governor pressure is used to effect the lock-up of converter clutch C.

A brief description at this point of the compensator 210 and the associated valve 220 will undoubtedly facilitate an understanding of the aforementioned operation of the control system for this transmission in the several forward drive ratios. When manually operable drive ratio selector valve 170 is set for initiating drive through through the Drive ratio then valve 170 admits line pressure fluid (approx. 90 p. s. i.) from supply conduit 191 to conduits 119 and 219. Line pressure fluid in conduit 119 passes through the throttle valve 120 to the left end of valves 140 and 160 as previously explained. Line pressure from conduit 119 can pass through valves 140 and 157 to apply the direct clutch D and release band 62 of planetary 60 to condition the transmission for the Drive ratio as previously explained if shift valve 141 has been upshifted to the left. The line pressure fluid admitted to conduit 219 when the transmission is set for the Drive ratio enters the valve 220 and forces the floating ball element 221 to the left so that the line pressure fluid in conduit 219 may pass from conduit 219 through valve 220 and into conduit 222 which directs it into chamber 146a of valve 140. Line pressure in chamber 146a is applied to the right end of the pilot valve 145 and this shifts the pilot valve 145 and the direct clutch shift valve 141 to the left and admits line pressure from conduits 155, 158 to the piston bore 71 of the direct clutch D to effect engagement thereof. Accordingly the planetary gearing 60 will be locked out of all drive when operating in the Drive ratio and the drive train is directly from the torque converter A to output shaft 81 as previously explained. With line pressure in conduit 219 and the ball element 221 of valve 220 closing the pressure fluid inlet port at the left end of valve 220, the governor pressure, which varies from approximately 0-90 p. s. i. depending on the speed of output shaft 81, will pass from conduit 103 through the governor pressure compensator 210 and into conduit 223 which directs the governor pressure fluid into chamber 166a at the right end of converter clutch control valve 160. Governor pressure fluid in chamber 166a of valve 160 tends to urge the pilot valve 165 and converter lock-up clutch shift valve 161 towards the left to effect lock-up of the converter C. As throttle pressure, which varies from 0-90 p. s. i. is already being directed into the chamber 163a at the left end of control valve 160, it is obvious that shift valve 161 will not shift over to the left to effect engagement of converter lock-up clutch C until after the governor pressure in chamber 166a exerts a greater leftwardly directed force on shift valve 161 than the rightwardly directed force of the throttle pressure in chamber 163a. It will be noted that the diameter of the pilot valve 165 is greater than the diameter of the shift valve 161 therefore when the throttle pressure in chamber 163a is equal to the governor pressure in chamber 166a, still a shift of valve 161 to the left will occur. Once the valves 161 and 165 begin to shift towards the left then the by-pass conduit 126e transfers throttle pressure to the right side of valve land 165a of pilot valve 165 and a snap-action upshift is effected that prevents hunting of the valves 161 and 165 and provides a very definite engagement point for the converter lock-up clutch C. This particular snap action valve control is more fully explained in the co-pending application of William L. Sheppard, Serial No. 98,493, filed June 11, 1949. It is thought to be obvious that once shift valve 161 moves to the left that then line pressure from conduit 125b can pass through valve bore 163 of valve 160 and into conduit 156 which directs this line pressure fluid into the converter lock-up clutch C to effect engagement of clutch C. From the description above it is thought to be apparent that the torque responsive throttle pressure in chamber 163a of control valve 160 and the speed responsive governor pressure in the chamber 166a of valve 160 conjointly control the automatic engagement and disengagement of the converter lock-up clutch C. Obviously the points for lock-up of the clutch C will vary depending on the particular relationship existing between the speed and torque conditions of the output shaft 81. When operating in the Drive ratio at wide open throttle, that is with a large torque load on shaft 81, the lock-up of clutch C might not occur until the vehicle speed has reached 45–50 miles per hour, whereas at light throttle under a light torque load, the clutch C could be automatically engaged at about 17 miles per hour vehicle speed. The automatic disengagement of clutch C would normally occur when the vehicle speed has been reduced to approximately 10–15 miles per hour. The various shift points can be adjusted to meet the particular desires of the operator by making certain changes in the valving that are thought to be rather obvious.

If while operating in the Drive ratio at a relatively high vehicle speed and/or light torque load such that the clutch C is engaged and the transmission is transmitting the positive direct drive, the vehicle operator should desire to accelerate in a torque multiplying ratio, it is merely necessary for the operator to fully depress the accelerator pedal 115 and this will manually overrule the automatic control of the clutch C and disengage the lock-up clutch C so that the converter A is then brought back into operation to provide a torque multiplying drive. This manual kickdown from the positive direct drive to a torque multiplying drive ratio is accomplished by means of the kickdown valve 230 and its associated elements which are controlled by the accelerator pedal 115. Linkage 116 of the accelerator 115 carries a finger-like projection 117 that is adapted to be engaged with the neck-like projection 231a on the right end of the piston valve 231 of the valve unit 230, after a predetermined depression of the accelerator 115. As accelerator 115 is fully depressed, the last 5 or 10 degrees of its downward throttle valve opening movement causes the finger-like linkage projection 117 to engage the projection 231a on valve 231 and shift the kickdown valve 231 to the left. Movement of valve 231 to the left connects the pressure fluid in conduits 232 and 233 through the relief valve 234 and this reduces the forces holding valve 161 in the upshifted position. This permits the pilot valve 165 and shift valve 161 for the torque converter lock-up clutch C to downshift to the right to effect disengagement of the clutch C and to simultaneously activate the converter A. The shift to the right of valves 161 and 165 is accelerated by the increased throttle pressure applied to the chamber 163a at the left end of valve 160 due to the full depression of the accelerator 115. Obviously, on release of the accelerator 115 the spring 235 of kickdown valve unit 230 will shift valve 231 to the right to its normally inactive position and the transmission control system will be returned to its automatically controllable condition.

On manual kickdown with the drive ratio selector lever 170 set for the Drive ratio, it will be noted that the leftward shift of kickdown valve 231 permits conduits 242 and 243 to be connected to the relief valve 244. This reduces the force holding the direct clutch shift valves 141 and 161 in their upshifted or leftward positions but due to the line pressure applied to the chamber 146a at the right end of valve 140, when the transmission is set for Drive, the shift valve 141 and pilot valve 145 are held in their upshifted positions even though the pressure in conduits 242 and 243 is reduced. This maintains the transmission in the selected Drive ratio with direct clutch D engaged.

If the manually operable drive ratio selector lever is set for initiating drive in the Breakaway drive ratio then line pressure fluid of approximately 90 p. s. i. will be directed from supply conduit 191 into conduits 119, 159 and 209 respectively. Line pressure that is directed into conduit 119 passes through the throttle valve 120 from whence line pressure is directed by conduits 125a and 125b to the servo 69 and the valves 140 and 160 respectively. Servo 69 is thus caused to apply the band 62 and this activates gear train 60 for the transmission of a torque multiplying underdrive. The line pressure fluid in conduit 125b remains inactive until the valves 161 and 141 are successively upshifted towards the left to effect step-by-step engagement of the converter lock-up clutch C and the direct drive clutch D. The successive step-by-step engagement of the clutches C and D is brought about by the line pressure fluid admitted to conduit 209 when the drive ratio selector valve 170 is set for Breakaway drive. Line pressure in conduit 209 is directed to the governor compensator unit 210 and is modulated by the compensator 210 so that a variable pressure of between 15–90 p. s. i. is passed through the compensator 210 to the conduit 223 and into the chamber 166a at the right end of converter lock-up clutch control valve 160. The modulated pressure transmitted through compensator 210 to conduit 223 and the pilot valve 165 for the converter lock-up clutch C is directly proportional to but greater than the governor pressure which exists in the conduit 193 at all vehicle speeds above approximately 8–10 miles per hour. With valve 170 set for Breakaway the conduit 219 is not pressurized with line pressure and the governor pressure (0–90 p. s. i.) in conduit 193 will force the ball element 221 of valve 220 to the right so that governor pressure can pass from conduit 193 through valve 220 into conduit 222 and be applied to the right end of pilot valve 165 of the direct clutch control valve 160. Thus in the Breakaway ratio throttle pressure (0–90 p. s. i.) is applied to the left ends of shift valves 141 and 161 while governor pressure and an increased, compensated governor pressure are applied to the right ends of the pilot valves 145 and 165 respectively. As the compensated governor pressure applied to pilot valve 165 is greater in value that the governor pressure applied to pilot valve 145, the shift valve 161 will be upshifted to the left to effect engagement of converter lock-up clutch C at a lower vehicle speed than the speed at which the shift valve 141 is upshifted to the left to effect engagement of the direct drive clutch D. This causes lock-up of the converter C first and thereafter release of gear brake band 62 and engagement of clutch D so as to give the two step upshift to the positive direct drive from the combination fluid and mechanically generated, torque multiplying Breakaway starting drive.

While traveling in the positively connected direct drive ratio with the drive ratio selector valve 170 set for Breakaway, the vehicle operator can also manually or otherwise overrule the automatic control system and kickdown to a torque multiplying underdrive ratio at any time the vehicle speed is below approximately 50 miles per hour. The kickdown is effected in the same manner as already explained with regard to the kickdown when traveling in the Drive ratio. A full depression of accelerator pedal 115 will cause lever 117 to shift kickdown valve 231 to the left and this will connect conduits 232 and 233 to relief valve 234 while conduits 242 and 243 are connected to relief valve 244. Reduction of the throttle pressure in conduits 242 and 243 permits direct clutch shift valve 141 and pilot valve 145 to shift to the right to effect release of clutch D and to simultaneously engage the brake band 62 of planetary gearing 60 through actuation of the servo 69. This conditions the transmission gear box B for the torque multiplying underdrive ratio. The reduction of the pressure of the fluid in conduits 232 and 233 by their connection to relief valve 234 on leftward shift of kickdown valve 231, when the transmission is set for Breakaway, is not a sufficient pressure reduction to overcome the effect of the relatively high compensated pressure in chamber 166a of converter clutch control valve 160. Accordingly, converter lock-up clutch shift and pilot valves 161 and 165 do not downshift to the right thus the converter lock-up clutch C remains engaged at all vehicle speed above 20–25 miles per hour and the kickdown in Breakaway is to a positively connected underdrive drive train that does not pass through the fluid of the torque converter. Due to this fact there is no slip in this kickdown ratio as might be the case with a kickdown through the torque converter and a positively connected gear train for acceleration as well as coast braking is available. Upon release of the accelerator 115 it is obvious that the automatic speed and torque responsive controls of the transmission will immediately take over operation of the transmission unit.

In the operation of this transmission in the Breakaway ratio the shift points are somewhat different from those when operating in the Drive ratio for the converter A does not have to remain engaged for as long a time due to the gear train 60 being available to provide a part of the torque multiplication. As a result of the gear train 60 operating in series with the torque converter A when the transmission is set for the Breakaway ratio, the speed of the output shaft 81 is accelerated at a greater rate than when the transmission is set for the Drive ratio and at the same time the speed of the engine driving the transmission will increase at a greater rate when operating in the Breakaway ratio than in the Drive ratio. Accordingly, the torque multiplication of the converter A ceases at a lower vehicle speed when operating in the Breakaway ratio than when operating in the Drive ratio. At wide open throttle the torque converter lock-up clutch C might engage at 25–30 miles per hour vehicle speed and the direct drive clutch D would engage at approximately 50–55 miles per hour vehicle speed when operating in the Breakaway ratio. At light throttle or low torque load the converter lock-up clutch C might engage at 13–15 miles per hour and the direct drive clutch D might engage at 18–20. At light throttle, automatic disengagement of the direct drive clutch D would occur at approximately 13 miles per hour vehicle speed while the converter lock-up clutch C would be disengaged at about 11 miles per hour. However, on coast drive at closed throttle, when the vehicle speed has been reduced to approximately 10–15 miles per hour, then the lock-up clutch C will disengage before the direct drive clutch D and this gives a fluid drive cushion for the disengagement of the direct drive clutch D and prevents jerks or the like.

If while operating in either the Drive ratio or the Breakaway ratio, it should become advantageous or necessary to employ a coasting gear for coast braking, it is merely necessary for the operator to manually or otherwise move the drive ratio selector lever 111 to the Coast position. This conditions the transmission for the same ratio that is also obtained by a kickdown from direct drive when operating in Breakaway. The converter lock-up clutch C will be applied, direct drive clutch D will be disengaged, and brake band 62 will be applied by servo 69 so that a positively connected underdrive ratio is available for the coast braking. This ratio will not slip and it will provide an adequate braking effect on coast drive. The Coast ratio may be manually shifted back into either of the forward drive ratios when the coast braking effect is no longer required. In the Coast ratio the control valving is set substantially the same as with the Breakaway ratio for the selector valve 170 still admits line pressure from supply conduit 191 to conduits 119, 159 and 209. In addition line pressure is now admitted to coast conduit 259 which conducts this pressure fluid to chamber 148 of the direct drive clutch valve 140. Line pressure in chamber 148 of valve 140 forces pilot valve 145 to shift to the right and this insures that shift valve 141 will be held in a downshifted position so as to maintain the direct drive clutch D in its disengaged position and cause application of the brake band 62 to thereby actuate the underdrive gear train 60 for coast braking.

Reverse drive is obtainable by shifting the manually operable drive ratio selector valve 170 to the Reverse position. This pressurizes conduits 159, 209, 259, 269, 269 and 270 with pressure fluid from supply conduit 191. Pressure fluid in conduits 159, 209 and 259 remains inactive however. Due to pressure fluid entering conduit 269 the pressure regulator valve 185 now establishes a line pressure of approximately 180 p. s. i. in the control system instead of the 90 p. s. i. that is utilized for the forward drive ratios. The increased pressure in the control system during Reverse drive is advantageous because of the increase torque reaction when operating in the 2:1 Reverse drive ratio. The conduit 270 conducts increased line pressure fluid to the chamber 59a of the reverse gear train servo 59 to apply reverse brake band 52 and condition the planetary gearing 50 for the transmission of a torque multiplying Reverse drive from the converter A to the output shaft 81. As the control system for the clutches C and D as well as the forward drive servo 69 are not pressurized it is thought to be obvious that there is no automatic upshifting or downshifting when operating in the Reverse drive ratio.

It is thought to be obvious from the foregoing description that there is provided an improved, highly flexible, simplified type of motor vehicle power transmission unit that provides all the necessary gear ratios and control features for maximum performance and driving comfort and yet permits manufacture and assembly at an economical figure.

I claim:

1. An engine driven power transmission unit comprising a driving member, a hydrokinetic torque converter including an impeller wheel drivingly connected to the driving member, a runner wheel, a guide wheel, and converter lock-up clutch means adapted to mechanically connect the impeller and runner wheels, a gear box including an input shaft drivingly connected to the runner wheel, an output shaft, a planetary gear train adapted to be drivingly connected between said input and output shafts comprising an annulus gear drivingly connected to the input shaft, a sun gear concentrically and rotatably mounted with respect to said annulus gear, brake means adapted to anchor said sun gear against rotation, a planet pinion carrier drivingly connected to said output shaft, a planet pinion rotatably mounted on said planet pinion carrier and arranged in meshing engagement with said annulus gear and said sun gear, and a direct drive clutch means for said planetary gear train adapted to drivingly connect said carrier and sun gear, and control means for said converter clutch, planetary brake and direct drive clutch including output shaft speed responsive and engine torque responsive control valving to automatically control the engagement and disengagement of said converter lock-up clutch means and said planetary brake means and direct drive clutch means, said control means being arranged to selectively provide a first starting underdrive ratio from said driving member through said converter and activated gear train to said output shaft and a second starting direct drive ratio from said driving member through said converter and the engaged direct drive clutch to said output shaft, said control means being adapted to automatically upshift each of said starting drive ratios to a positively connected, one-to-one, direct drive ratio from said driving member to said output shaft.

2. An engine driven power transmission unit comprising a driving member, a hydrokinetic torque converter including an impeller wheel drivingly connected to the driving member, a runner wheel, a guide wheel, and converter lock-up clutch means adapted to be operated to positively connect the impeller and runner wheels, a gear box including an input shaft drivingly connected to the runner wheel, an output shaft, a planetary gear train adapted to be drivingly connected between said input and output shafts comprising an annulus gear drivingly connected to the input shaft, a sun gear concentrically and rotatably mounted with respect to said annulus gear, brake means adapted to anchor said sun gear against rotation, a planet pinion carrier drivingly connected to said output shaft, a planet pinion rotatably mounted on said planet pinion carrier and arranged in meshing engagement with said annulus gear and said sun gear, and a direct drive clutch means for said planetary gear train adapted to drivingly connect said carrier and sun gear, and control means comprising output shaft speed responsive and engine torque responsive control valving to automatically control the engagement and disengagement of said converter lock-up clutch means and said planetary brake means and direct drive clutch means, said control means being arranged to selectively provide a first starting underdrive ratio from said driving member through said converter and activated gear train to said output shaft and a second starting direct drive ratio from said driving member through said converter and the engaged direct drive clutch to said output shaft, said control means being adapted to automatically upshift each of said starting drive ratios to a positively connected, one-to-one, direct drive ratio from said driving member to said output shaft, said control means for said several clutch means being arranged to effect successive engagement of said converter clutch means and then the direct drive clutch means on the upshift to direct drive when operating in the first starting drive and to normally effect successive disengagement of the direct drive clutch and then the converter clutch means on the downshift from direct drive when operating in the first starting drive ratio.

3. An engine driven power transmission unit comprising a driving member, a hydrokinetic torque converter including an impeller wheel drivingly connected to the driving member, a runner wheel, a guide wheel, and converter lock-up clutch means adapted to be operated to positively connect the impeller and runner wheels, a gear box including an input shaft drivingly connected to the runner wheel, an output shaft, a planetary gear train adapted to be drivingly connected between said input and output shafts comprising an annulus gear drivingly connected to the input shaft, a sun gear concentrically and rotatably mounted with respect to said annulus gear, brake means adapted to anchor said sun gear against rotation, a planet pinion carrier drivingly connected to said output shaft, a planet pinion rotatably mounted on said planet pinion carrier and arranged in meshing engagement with said annulus gear and said sun gear, and a direct drive clutch means for said planetary gear train adapted to drivingly connect said carrier and sun gear, manually operable control means to select the starting drive ratios by operation of said clutch and brake means and control means comprising output shaft speed responsive and engine torque responsive control valving to automatically control the engagement and disengagement of said converter lock-up clutch means and said planetary brake means and direct drive clutch means, and driver operable output shaft torque control means adapted to manually overrule the automatically operable control means for the several clutch means said control means being arranged to selectively provide a first starting underdrive ratio from said driving member through said converter and activated gear train to said output shaft and a second starting direct drive ratio from said driving member through said converter and the engaged direct drive clutch to said output shaft, said control means being adapted to automatically upshift each of said starting drive ratios to a positively connected, one-to-one, direct drive ratio from said driving member to said output shaft, said driver operable output shaft torque control means providing means to downshift the transmission from the positively connected, one-to-one direct drive ratio to either of preselected starting drive ratios.

4. A power transmission unit comprising a driving member, a hydrokinetic torque converter including an impeller wheel drivingly connected to the driving member, a runner wheel, a guide wheel, and converter lock-up clutch means adapted to be operated to positively connect the impeller and runner wheels, a gear box including an input shaft drivingly connected to the runner wheel, an output shaft, a planetary gear train adapted to be drivingly connected between said input and output shafts comprising an annulus gear drivingly connected to the input shaft, a sun gear concentrically and rotatably mounted with respect to said annulus gear, brake means adapted to anchor said sun gear against rotation, a planet pinion carrier drivingly connected to said output shaft, a planet pinion rotatably mounted on said planet pinion carrier and arranged in meshing engagement with said annulus gear and said sun gear, and a direct drive clutch means for said planetary gear train adapted to drivingly connect said carrier and sun gear and control means comprising output shaft speed and torque responsive control devices to automatically control the engagement and disengagement of said converter lock-up clutch means and said planetary brake means and direct drive clutch means said control means being arranged to selectively provide a first starting underdrive ratio from said driving member through said converter and activated gear train to said output shaft and a second starting direct drive ratio from said driving member through said converter and the engaged direct drive clutch to said output shaft, said control means being adapted to automatically upshift each of said starting drive ratios to a positively connected, one-to-one, direct drive ratio from said driving member to said output shaft, a first driver operable control means adapted to vary the torque of the output shaft and providing a means to manually overrule the automatically operable control means for the converter lock-up clutch means and the direct drive clutch means whereby said several clutch means my be disengaged at the will of the operator and a positive one-to-one direct drive downshifted to the preselected starting drive ratio, and a second driver operable control means to manually disengage said direct drive clutch means and to maintain said direct drive clutch means disengaged irrespective of the torque and speed condition of the output shaft so as to maintain said transmission in an underdrive ratio through said planetary gear train.

5. A power transmission unit for a motor vehicle having an engine, an accelerator control therefor, and a transmission drive ratio selector lever, said power transmission unit comprising a hydrokinetic torque converter including an impeller wheel drivingly connected to the engine, a runner wheel, a guide wheel, and converter lock-up clutch means adapted to positively connect the impeller and runner wheels, a gear box including an input shaft drivingly connected to the runner wheel, an output shaft, a planetary gear train adapted to be drivingly connected between said input nad output shafts comprising an annulus gear drivingly connected to the input shaft, a sun gear concentrically and rotatably mounted with respect to said annulus gear, brake means adapted to anchor said sun gear against rotation, a planet pinion carrier drivingly connected to said output shaft, a planet pinion rotatably mounted on said planet pinion carrier and arranged in meshing engagement with said annulus gear and said sun gear and a planetary direct drive clutch means adapted to drivingly connect said carrier and said sun gear to provide for a direct one-to-one drive through said planetary gear train, control means operable by said drive ratio selector lever to selectively condition said power transmission unit for a first starting, torque multiplying, direct drive from said engine through said converter and engaged direct drive clutch to said output shaft and for a second starting, torque multiplying, underdrive from said engine through the series arranged converter activated planetary gear train to said output shaft, said control means including output shaft speed responsive and engine torque responsive control means adapted to automatically operate said clutch and brake means to thereby provide means to automatically upshift either of the pre-selected starting drives to a positively connected, one-to-one, direct drive from the engine to the output shaft and to automatically downshift the positively connected, one-to-one, direct drive to the preselected starting drive with changes in the output shaft speed and engine torque.

6. A power transmission unit for a motor vehicle having an engine, an accelerator control therefor, and a transmission drive ratio selector lever, said power transmission unit comprising a hydrokinetic torque converter including an impeller wheel drivingly connected to the engine, a runner wheel, a guide wheel, and converter lock-up clutch means adapted to be engaged to positively connect the impeller and runner wheels, a gear box including an input shaft drivingly connected to the runner wheel, an output shaft, a planetary gear train adapted to be drivingly connected between said input and output shafts comprising an annulus gear drivingly connected to the input shaft, a sun gear concentrically and rotatably mounted with respect to said annulus gear, brake means adapted to anchor said sun gear against rotation, a planet pinion carrier drivingly connected to said output shaft, a planet pinion rotatably mounted on said planet pinion carrier and arranged in meshing engagement with said annulus gear and said sun gear and a planetary direct drive clutch means adapted to drivingly connect said carrier and said sun gear to provide for transmission of a one-to-one direct drive by said planetary gear train, control means operable by said drive ratio selector lever to selectively condition said power transmission unit for a first starting, torque multiplying, direct drive from said engine through said converter and engaged direct drive clutch to said output shaft and for a second starting, torque multiplying, underdrive from said engine through the series arranged converter and activated planetary gear train to said output shaft, said control means including output shaft speed and torque responsive control valving adapted to automatically operate said clutch and brake means to thereby provide means to automatically upshift either of the pre-selected starting drives to a positively connected, one-to-one, direct drive from the engine to the output shaft and to automatically downshift the positively connected, one-to-one direct drive to the pre-selected starting drive with changes in the output shaft speed and engine torque, and driver operable accelerator controlled means to overrule the automatic downshifting of said positively connected, one-to-one, direct drive to the pre-selected torque multiplying starting drive to thereby provide for such a downshift at the will of the vehicle operator.

7. A power transmission unit for a motor vehicle having an engine, an accelerator control therefor, and a transmission drive ratio selector lever, said power transmission unit comprising a hydrokinetic torque converter including an impeller wheel drivingly connected to the engine, a runner wheel, a guide wheel, and converter lock-up clutch means adapted to be engaged to positively connect the impeller and runner wheels, a gear box including an input shaft drivingly connected to the runner wheel, an output shaft, a planetary gear train adapted to be drivingly connected between said input and output shafts comprising an annulus gear drivingly connected to the input shaft, a sun gear concentrically and rotatably mounted with respect to said annulus gear, brake means adapted to anchor said sun gear against rotation, a planet pinion carrier drivingly connected to said output shaft, a planet pinion rotatably mounted on said planet pinion carrier and arranged in meshing engagement with said annulus gear and said sun gear and a planetary direct drive clutch means adapted to drivingly connect said carrier and said sun gear to provide means for the transmission of a positive, one-to-one, direct drive by said gear train, control means operable by said drive ratio selector lever to selectively condition said power transmission unit for a first starting, torque multiplying, direct drive from said engine through said converter and engaged direct drive clutch to said output shaft and for a second starting, torque multiplying, underdrive from said engine through the series arranged converter and activated planetary gear train to said output shaft, and said control means including output shaft speed and torque responsive control valving adapted to automatically operate said clutch and brake means to thereby provide means to automatically upshift either of the pre-selected starting drives to a positively connected, one-to-one, direct drive from the engine to the output shaft and to automatically downshift the positively connected, one-to-one, direct drive to the pre-selected starting drive with changes in the output shaft speed and engine torque, and driver operable accelerator controlled means to overrule the automatic downshifting of said positively connected, one-to-one, direct drive to the pre-selected torque multiplying starting drive to thereby provide for such a downshift at the will of the vehicle operator, and drive ratio selector lever operated means to downshift said positively connected, one-to-one, direct drive to a torque multiplying positively connected, underdrive that will be maintained regardless of variations in the output shaft speed and engine torque.

8. A power transmission unit comprising a driving member, a hydrokinetic torque converter including an impeller wheel drivingly connected to the driving member, a runner wheel, a guide wheel, and converter lock-up clutch means adapted to be engaged to positively connect the impeller and runner wheels, a gear box including an input shaft drivingly connected to the runner wheel, an output shaft, a planetary gear train adapted to be activated to be drivingly connected between said input and output shafts to provide for the transmission of a first starting torque multiplying underdrive therebetween, and planetary direct drive clutch means adapted to lock up said planetary gear train and be engaged to provide for the transmission by said gear train of a second starting, one-to-one, direct drive between said shafts, control means comprising hydraulically operated output shaft speed responsive and engine torque responsive control valving to automatically control the engagement and disengagement of said converter lock-up clutch and said planetary direct drive clutch and activation of said planetary gear train for the transmission of said underdrive ratio, and manually operable drive ratio selector means associated with the transmission unit controls and adapted to selectively condition the power transmission unit for the transmission of said first starting direct drive ratio from said converter runner wheel through said input shaft and locked up gear train to said output shaft, and for said second starting underdrive ratio from said converter runner wheel through said input shaft and activated planetary gear train to said output shaft, said output shaft speed and torque responsive control valving being adapted to automatically engage the several clutch means and control activation of the gear train to automatically upshift each of the starting drive ratios to a positively connected, one-to-one, direct drive ratio and to automatically disengage said clutches and control activation of said gear train to automatically downshift said, one-to-one, direct drive ratio to the pre-selected starting drive ratio with variations in speed and torque of said output shaft.

9. A power transmission unit for a motor vehicle having an engine, an accelerator therefor, and a manually operable transmission drive ratio selector lever, said power transmission unit comprising a hydrokinetic torque converter including an impeller wheel drivingly connected to the engine, a runner wheel, a guide wheel, and clutch means adapted to be engaged to directly drivingly connect the impeller and runner wheels, a gear box including an input shaft drivingly connected to the runner wheel, an output shaft, a planetary gear train adapted to be drivingly connected between said input and output shafts, brake means associated with said gear train adapted to be applied to activate said planetary gear train to provide means for the transmission of a torque multiplying underdrive from said input shaft to said output shaft, and direct drive clutch means associated with said planetary gear train adapted to be engaged to provide means for the transmission of a positive, one-to-one, direct drive from said input shaft to said output shaft, and a control system for said power transmission unit comprising means operable by said drive ratio selector lever to selectively apply the planetary brake means and disengage the converter and direct drive clutch means to condition said transmission for a first starting drive through a combination fluid and mechanically generated, torque multiplying, underdrive and to disengage the planetary brake band and converter clutch means and apply the direct drive clutch means to condition said transmission for a second starting drive through a fluid generated, torque multiplying direct drive, said control system including output shaft speed responsive and engine torque responsive control means to automatically operate the planetary brake means and each of the clutch means to automatically upshift either of the pre-selected starting, torque multiplying drives to a positively connected, one-to-one, direct drive from the engine to the output shaft.

10. A power transmission unit for a motor vehicle having an engine, an accelerator therefor, and a manually operable transmission drive ratio selector lever, said power transmission unit comprising a hydrokinetic torque converter including an impeller wheel drivingly connected to the engine, a runner wheel, a guide wheel, and clutch means adapted to be engaged to directly drivingly connect the impeller and runner wheels, a gear box including an input shaft drivingly connected to the runner wheel, an output shaft, a planetary gear train adapted to be drivingly connected between said input and output shafts, brake means associated with said gear train adapted to be applied to activate said planetary gear train to provide means for the transmission of a torque multiplying underdrive from said input shaft to said output shaft, and direct drive clutch means associated with said planetary gear train adapted to be engaged to provide means for the transmission of a positive, one-to-one, direct drive from said input shaft to said output shaft, and a control system for said power transmission unit comprising means operable by said drive ratio selector lever to selectively apply the planetary brake means and disengage the converter and direct drive clutch means to condition said transmission for a first starting drive through a combination fluid and mechanically generated, torque multiplying, underdrive and to disengage the planetary brake band and converter clutch means and apply the direct drive clutch means to condition said transmission for a second starting drive through a fluid generated, torque multiplying, direct drive, said control system comprising hydraulically operated output shaft speed responsive and engine torque responsive control valving to automatically operate the planetary brake means and each of the clutch means to automatically upshift either of the pre-selector starting, torque multiplying, drives to a positively connected, one-to-one, direct drive from the engine to the output shaft, said speed and torque responsive control valving being operative to automatically downshift the positively connected, one-to-one, direct drive to the pre-selected starting drive with changes in relationship between the output shaft speed and engine torque.

11. A power transmission unit for a motor vehicle having an engine, an accelerator therefor, and a manually operable transmission drive ratio selector lever, said power transmission unit comprising a hydrokinetic torque converter including an impeller wheel drivingly connected to the engine, a runner wheel, a guide wheel, and clutch means adapted to be engaged to directly drivingly connect the impeller and runner wheels, a gear box including an input shaft drivingly connected to the runner wheel, an output shaft, a planetary gear train adapted to be drivingly connected between said input and output shafts, brake means associated with said gear train adapted to be applied to activate said planetay gear train to provide means for the transmission of a torque multiplying underdrive from said input shaft to said output shaft, and direct drive clutch means associated with said planetary gear train adapted to be engaged to provide means for the transmission of a positive, one-to-one, direct drive from said input shaft to said output shaft, and a control system for said power transmission unit comprising means operable by said drive ratio selector lever to selectively apply the planetary brake means and disengage the converter and direct drive clutch means to condition the transmission for a first starting drive through a combination fluid and mechanically generated, torque multiplying, underdrive and to disengage the planetary brake band and converter clutch means and apply the direct drive clutch means to condition the transmission for a second starting drive through a fluid generated, torque multiplying, direct drive, said control system comprising fluid operated output shaft speed responsive and engine torque responive control means to automatically operate the planetary brake means and each of the clutch means to automatically upshift either of the pre-selected starting, torque multiplying, drives to a positively connected, one-to-one, direct drive from the engine to the output shaft, said speed and torque responsive control means being operative to automatically downshift the positively connected direct drive to the selected starting drive with changes in relationship between the output shaft speed and engine torque conditions, and accelerator controlled means to effect a transition from the positively connected, one-to-one, direct drive to the pre-selected starting drive at the will of the vehicle operator and prior to the time said speed and torque responsive control means would automatically effect such a transition.

12. A power transmission unit for a motor vehicle having an engine, an accelerator therefor, and a manually operable transmission drive ratio selector lever, said power transmission unit comprising a hydrokinetic torque converter including an impeller wheel drivingly connected to the engine, a runner wheel, a guide wheel, and clutch means adapted to be engaged to directly drivingly connect the impeller and runner wheels, a gear box including an input shaft drivingly connected to the runner wheel, an output shaft, a planetary gear train adapted to be drivingly connected between said input and output shafts, brake means associated with said gear train adapted to be applied to activate said planetary gear train to provide means for the transmission of a torque multiplying underdrive from said input shaft to said output shaft, and direct drive clutch means associated with said planetary gear train adapted to be engaged to provide means for the transmission of a positive, one-to-one, direct drive from said input shaft to said output shaft, and a pressure fluid operated control system for said power transmission unit comprising a source of pressure fluid, conduit means connecting said source to said planetary brake means and said converter and direct drive clutch means to provide for pressure fluid operation thereof, a manually operable drive ratio selector valve connected to said conduit means and to said drive ratio selector lever adapted to selectively condition said power transmission unit for a first, starting, combination fluid and mechanically generated, torque multiplying, underdrive and a second, starting, fluid generated, torque multiplying, direct drive, control valving connected with said conduit means to control operation of said brake means and said converter and direct drive clutch means including output shaft speed responsive and engine torque responsive pressure fluid operated control valving adapted to automatically operate said clutches and brake means to upshift each of said pre-selected starting drives to a positively connected, one-to-one, direct drive and to automatically downshift said positively connected, one-to-one, direct drive to the pre-selected starting drive with changes in the output shaft speed and the engine torque.

13. A power transmission unit for a motor vehicle having an engine, an accelerator therefor, and a manually operable transmission drive ratio selector lever, said power transmission unit comprising a hydrokinetic torque converter including an impeller wheel drivingly connected to the engine, a runner wheel, a guide wheel, and clutch means adapted to be engaged to directly drivingly connect the impeller and runner wheels, a gear box including an input shaft drivingly connected to the runner wheel, an output shaft, a planetary gear train adapted to be drivingly connected between said input and output shafts, brake means associated with said gear train adapted to be applied to activate said planetary gear train to provide means for the transmission of a torque multiplying underdrive from said input shaft to said output shaft, and direct drive clutch means associated with said planetary gear train adapted to be engaged to provide means for the transmission of a positive, one-to-one, direct drive from said input shaft to said output shaft, and a pressure fluid operated control system for said power transmission unit comprising a source of pressure fluid, conduit means connecting said source to said planetary brake means and said converter and direct drive clutch means to provide for pressure fluid operation thereof, a manually operable drive ratio selector valve connected to said conduit means and to said drive ratio selector lever adapted to selectively condition said power transmission unit for a first, starting, combination fluid and mechanically generated, torque multiplying, underdrive and a second, starting, fluid generated, torque multiplying, direct drive, control valving connected with said conduit means to control operation of said brake means and said converter and direct drive clutch means including output shaft speed responsive and engine torque responsive pressure fluid operated control valving adapted to automatically operate said clutches and brake means to upshift each of said pre-selected starting drives to a positively connected, one-to-one, direct drive and to downshift said positively connected, one-to-one, direct drive to the pre-selected starting drive with changes in the output shaft speed and engine torque, said control system including an accelerator controlled kickdown valve adapted to effect a downshift of the positive, one-to-one, direct drive to the pre-selected starting drive at the will of the vehicle operator.

14. A power transmission unit for a motor vehicle having an engine, an accelerator therefor, and a manually operable transmission drive ratio selector lever, said power transmission unit comprising a hydrokinetic torque converter including an impeller wheel drivingly connected to the engine, a runner wheel, a guide wheel, and clutch means adapted to be engaged to directly drivingly connect the impeller and runner wheels, a gear box including an input shaft drivingly connected to the runner wheel, an output shaft, a planetary gear train adapted to be drivingly connected between said input and output shafts, brake means associated with said gear train adapted to be applied to activate said planetary gear train to provide means for the transmission of a torque multiplying underdrive from said input shaft to said output shaft, and direct drive clutch means associated with said planetary gear train adapted to be engaged to provide means for the transmission of a positive, one-to-one, direct drive from said input shaft to said output shaft, and a pressure fluid operated control system for said power transmission unit comprising a source of pressure fluid, conduit means connecting said source to said planetary brake means and said converter and direct drive clutch means to provide for pressure fluid operation thereof, a manually operable drive ratio selector valve connected to said conduit means and to said drive ratio selector lever adapted to selectively condition said power transmission unit for a first, starting, combination fluid and mechanically generated, torque multiplying, underdrive and a second, starting, fluid generated, torque multiplying, direct drive, control valving associated with said conduit means to control operation of said brake means and said converter and direct drive clutch means including output shaft speed responsive and engine torque responsive pressure fluid operated control valving adapted to automatically operate said control valving to upshift each of said pre-selected starting drives to a positively connected, one-to-one, direct drive and to downshift said positively connected, one-to-one, direct drive to the pre-selected starting drive with changes in the output shaft speed and the engine torque, said manually operable drive ratio selector valve including means to overrule the automatic operation of the speed and torque responsive control valving whereby said power transmission unit may be locked in a positively connected underdrive ratio transmitted through said planetary gear unit.

15. A power transmission unit for a motor vehicle having an engine, an accelerator therefor, and a manually operable transmission drive ratio selector lever, said power transmission unit comprising a hydrokinetic torque converter including an impeller wheel drivingly connected to the engine, a runner wheel, a guide wheel, and clutch means adapted to be engaged to directly drivingly connect the impeller and runner wheels, a gear box including an input shaft drivingly connected to the runner wheel, an output shaft, a planetary gear train adapted to be drivingly connected between said input and output shafts, brake means associated with said gear train adapted to be applied to activate said planetary gear train to provide means for the transmission of a torque multiplying underdrive from said input shaft to said output shaft, and direct drive clutch means associated with said planetary gear train adapted to be engaged to provide means for the transmission of a positive, one-to-one, direct drive from said input shaft to said output shaft, and a pressure fluid operated control system for said power transmission unit comprising a source of pressure fluid, conduit means connecting said source to said planetary brake means and said converter and direct drive clutch means to provide for pressure fluid operation thereof, a manually operable drive ratio selector valve connected to said conduit means and to said drive ratio selector lever adapted to selectively condition said power transmission unit for a first, starting, combination fluid and mechanically generated, torque multiplying, underdrive and a second, starting, fluid generated, torque multiplying, direct drive, control valving associated with said conduit means to control operation of said brake means and said converter and direct drive clutch means including output shaft speed responsive and engine torque responsive pressure fluid operated control means adapted to automatically operate said control valving to upshift each of said pre-selected starting drives to a positively connected, one-to-one, direct drive and to downshift said positively connected, one-to-one, direct drive to the pre-selected starting drive with changes in the output shaft speed and the engine torque, said manually operable drive ratio selector valve including means to overrule the automatic operation of the speed and torque responsive control valving whereby said power transmission unit may be locked in a positively connected underdrive ratio, and accelerator actuated, valve means connected with said control valving adapted to overrule the automatic operation of said output shaft speed responsive and engine torque responsive control valving to effect a downshift from the positively connected, one-to-one, direct drive to the pre-selected starting drive at the will of the vehicle operator.

16. A power transmission unit for a motor vehicle having an engine, an accelerator therefor, and a manually operable transmission drive ratio selector lever, said power transmission unit comprising a hydrokinetic torque converter including an impeller wheel drivingly connected to the engine, a runner wheel, a guide wheel, and clutch means adapted to be engaged to directly drivingly connect the impeller and runner wheels, a gear box including an input shaft drivingly connected to the runner wheel, an output shaft, a planetary gear train adapted to be drivingly connected between said input and output shafts, brake means associated with said gear train adapted to be applied to activate said planetary gear train to provide means for the transmission of a torque multiplying underdrive from said input shaft to said output shaft, and direct drive clutch means associated with said planetary gear train adapted to be engaged to provide means for the transmission of a direct drive from said input shaft to said output shaft, and a pressure fluid operated control system for said power transmission unit comprising valve means operable by said drive ratio selector lever to selectively apply the planetary brake means and disengage the converter and direct drive clutch means to condition said transmission for a first starting drive through a combination fluid and mechanically generated, torque multiplying, underdrive, and to disengage the planetary brake band and converter clutch means and apply the direct drive clutch means to lock up said planetary gear train and condition said transmission for a second starting drive through a fluid generated, torque multiplying direct drive, and output shaft speed responsive and engine torque responsive pressure fluid operated control valving cooperatively arranged to automatically operate the planetary brake means and each of the clutch means to automatically convert either of the pre-selected starting, torque multiplying drives to a positively connected, one-to-one, direct drive from the engine to the output shaft, said speed and torque responsive valving being under the control of an accelerator operated control valve and being arranged such that on initiating drive through the first starting drive ratio the speed and torque responsive valving will first effect engagement of said converter clutch means and subsequently cause substantially simultaneous release of the planetary brake means and engagement of the direct drive clutch, said speed and torque responsive valving also being arranged such that on initiating drive through the second starting drive ratio the converter clutch means will be subsequently engaged when the speed and torque of the output shaft have attained predetermined relationships.

17. A power transmission unit as set forth in claim 16 wherein the pressure fluid operated control system includes a compensator valve unit connected to the speed responsive pressure fluid operated control valving to selectively apply different clutch engaging operating pressures to the direct drive clutch depending on which of the starting ratios has been pre-selected.

18. A power transmission unit as set forth in claim 16 wherein the pressure fluid operated control system includes valve means operable by a predetermined movement of said accelerator to provide means to overrule the automatic operation of said output shaft speed and torque responsive pressure fluid operated valving whereby the positively connected direct drive can be kicked down to the pre-selected starting drive ratio.

19. A power transmission unit for a motor vehicle having an engine, an accelerator therefor, and a manually operable transmission drive ratio selector lever, said power transmission unit comprising a hydrokinetic torque converter including an impeller wheel drivingly connected to the engine, a runner wheel, a guide wheel, and converter clutch means adapted to be engaged to directly drivingly connect the impeller and runner wheels, a gear box including an input shaft drivingly connected to the runner wheel, an output shaft, a planetary gear train adapted to be drivingly connected between said input and output shafts, brake means associated with said gear train adapted to be applied to activate said planetary gear train to provide means for the transmission of a torque multiplying underdrive from said input shaft to said output shaft, and direct drive clutch means associated with said planetary gear train adapted to be engaged to provide means for the transmission of a direct, one-to-one, drive from said input shaft to said output shaft, and a pressure fluid operated control system for said power transmission unit comprising a source of pressure fluid, conduit means connecting said source to said planetary brake means and to said converter clutch means and direct drive clutch means to provide for pressure fluid operation thereof, a manually operable drive ratio selector valve connected to said conduit means and to said drive ratio selector lever adapted to be operated to selectively condition said power transmission unit for a first, starting combination fluid and mechanically generated, torque multiplying, underdrive and a second, starting, fluid generated, torque multiplying, direct drive, control valving connected with said conduit means to control operation of said brake means and said converter clutch means and direct drive clutch means, and output shaft speed responsive and engine torque responsive pressure fluid operated control valving adapted to automatically operate said several clutch and brake means to convert each of said pre-selected starting drives to a positively connected, one-to-one, direct drive and to automatically convert said positively connected, one-to-one, direct drive to the pre-selected starting drive with changes in the speed and torque relationship of said output shaft, said speed and torque responsive control valving being under the control of an accelerator operated control valve that is connected to the said conduit means, said speed and torque responsive valving being arranged such that on initiating drive through the pre-selected first starting drive the converter clutch will be engaged prior to release of the brake means and engagement of the direct drive clutch to effect the automatic upshift to direct drive and when initiating drive through the pre-selected second starting drive the speed and torque responsive valving retains said direct drive clutch engaged prior to and after engagement of the converter clutch.

20. A power transmission unit for a motor vehicle having an engine, an accelerator therefor, and a manually operable transmission drive ratio selector lever, said power transmission unit comprising a hydrokinetic torque converter including an impeller wheel drivingly connected to the engine, a runner wheel, a guide wheel, and clutch means adapted to be engaged to directly drivingly connect the impeller and runner wheels, a gear box including an input shaft drivingly connected to the runner wheel, an output shaft, a planetary gear train adapted to be drivingly connected between said input and output shaft, brake means associated with said gear train adapted to be applied to activate said planetary gear train to provide means for the transmission of a torque multiplying underdrive from said input shaft to said output shaft, and direct drive clutch means associated with said planetary gear train adapted to be engaged to provide means for the transmission of a one-to-one, direct drive from said input shaft to said output shaft, and a pressure fluid operated control system for said power transmission unit comprising a source of pressure fluid, conduit means connecting said source to said planetary brake means and said converter and direct drive clutch means to provide for pressure fluid operation thereof, a manually operable drive ratio selector valve connected to said conduit means and to said drive ratio selector lever adapted to be operated to selectively condition said power transmission unit for a first, starting, combination fluid and mechanically generated, torque multiplying, underdrive and a second, starting, fluid generated, torque multiplying, direct drive, control valving connected with said conduit means to control operation of said brake means and said converter and direct drive clutch means, including output shaft direct drive clutch means, including output shaft speed responsive and engine torque responsive pressure fluid operated control valving adapted to automatically operate said several clutch and brake means to convert each of said starting drives to a positively connected, one-to-one, direct drive and to automatically convert said positively connected direct drive to the pre-selected starting drive with changes in the speed and torque relationship of said output shaft, said control system including an accelerator operated valve to control operation of said speed and torque responsive valving.

21. In a power transmission unit as set forth in claim 20 wherein the pressure fluid operated control system includes a compensator valve to modify the pressure fluid applied to the direct drive clutch to effect engagement thereof depending on which of the starting drives is pre-selected, said compensator valve applying a greater clutch engaging pressure to the direct drive clutch when the second starting direct drive is utilized for initiating drive than when the first starting drive is utilized for drive initiation.

22. In a power transmission unit as set forth in claim 20 wherein the pressure fluid operated control system includes an accelerator operated valve to overrule automatic operation of the torque and speed responsive valving and provide means for effecting a downshift from the positive direct drive to the pre-selected starting drive at the will of the operator.

23. In a power transmission unit as set forth in claim 20 wherein the pressure fluid operated control system includes a compensator valve unit adapted to vary the points of output shaft speed at which the converter clutch means will be engaged depending on whether the transmission is set for initiation of drive in said first or said second starting drive.

24. In a power transmission unit as set forth in claim 23 wherein said compensator valve unit is arranged to effect engagement of said converter clutch means at a lower output shaft speed when said transmission is set for initiation of drive in the first starting drive than when the said transmission is set for the initiation of drive in the second starting drive.

PAUL C. ACKERMAN.

References Cited in the file of this patent

UNITED STATES PATENTS

| Number | Name | Date |
| --- | --- | --- |
| 2,332,593 | Nutt et al. | Oct. 26, 1943 |
| 2,374,303 | Osborne | Apr. 24, 1945 |
| 2,478,868 | Hasbany | Aug. 9, 1949 |
| 2,516,208 | Hasbany | July 25, 1950 |
| 2,562,464 | Jandasek | July 31, 1951 |
| 2,568,007 | Jandasek | Sept. 18, 1951 |
| 2,640,373 | Jandasek | June 2, 1953 |

OTHER REFERENCES

Packard Serviceman's Training Book, June 27, 1949, Packard Motor Car Co.

Product Engineering, vol. 21, No. 1 (pages 94 to 97, incl.).